United States Patent
Chandra et al.

(10) Patent No.: US 10,785,719 B2
(45) Date of Patent: *Sep. 22, 2020

(54) POWER EFFICIENT BASE STATION

(71) Applicant: Microsoft Technology Licensing, LLC, Redmond, WA (US)

(72) Inventors: Ranveer Chandra, Kirkland, WA (US); Zerina Kapetanovic, Seattle, WA (US); Deepak Vasisht, Cambridge, MA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,553

(22) Filed: Apr. 2, 2019

(65) Prior Publication Data

US 2019/0230589 A1 Jul. 25, 2019

Related U.S. Application Data

(63) Continuation of application No. 15/487,161, filed on Apr. 13, 2017, now Pat. No. 10,313,967.

(51) Int. Cl.
*H04L 12/28* (2006.01)
*H04W 52/02* (2009.01)
(Continued)

(52) U.S. Cl.
CPC ......... *H04W 52/0206* (2013.01); *H02J 3/383* (2013.01); *H02J 3/386* (2013.01);
(Continued)

(58) Field of Classification Search
CPC .... H04B 7/155; H04B 7/2606; H04B 7/2662; H04L 12/5895; H04L 43/10;
(Continued)

(56) References Cited

U.S. PATENT DOCUMENTS

2013/0121176 A1* 5/2013 Addepalli ............... H04L 67/12 370/252
2014/0372577 A1* 12/2014 Hui ..................... H04L 41/0816 709/221

(Continued)

OTHER PUBLICATIONS

Won et al, FarmBeats: An IoT platform for data-driven agriculture, USENIX, 17 pages, Mar. 2017.*

(Continued)

*Primary Examiner* — Frank Duong
(74) *Attorney, Agent, or Firm* — Fountainhead Law Group P.C.

(57) ABSTRACT

A base station utilizes duty cycle requirements of each of multiple base station components to efficiently consume power. The base station may include a synchronization module that allows the base station to send collected data from a cache to a gateway, which then, sends it up to the cloud. The base station may also include a sensor connectivity module that establishes a connection between the base station and data collecting devices deployed to collect data for storage in the cache. A base station controller serves as the cache for the data collected by the sensor module and sends the data to the gateway for synchronization in the cloud using the synchronization module. A base station controller determines/coordinates the duty cycle of the sensor connectivity module and synchronization module in a power efficient way depending on the current power available to the base station, network needs, and the weather conditions.

20 Claims, 6 Drawing Sheets

(51) Int. Cl.
*H04L 29/08* (2006.01)
*H04L 12/26* (2006.01)
*H02J 3/38* (2006.01)
*H04W 88/08* (2009.01)
*H04W 88/16* (2009.01)
*H02J 7/35* (2006.01)

(52) U.S. Cl.
CPC .......... *H04L 43/10* (2013.01); *H04L 67/1095* (2013.01); *H04L 67/2842* (2013.01); *H04W 52/0258* (2013.01); *H04W 52/0277* (2013.01); *H02J 7/35* (2013.01); *H04W 88/08* (2013.01); *H04W 88/16* (2013.01); *Y02D 70/00* (2018.01); *Y02D 70/10* (2018.01); *Y02D 70/14* (2018.01); *Y02D 70/142* (2018.01)

(58) Field of Classification Search
CPC .. H04L 67/1095; H04L 67/2842; H04J 3/383; H04J 3/386; H04J 2011/0096; H04W 8/26; H04W 16/26; H04W 52/0206; H04W 56/0045; H04W 80/04; H04W 84/047; H04W 84/12; H04W 84/18; H04W 88/04; H04W 88/06; H04W 88/08
See application file for complete search history.

(56) References Cited

U.S. PATENT DOCUMENTS

| 2016/0345260 A1* | 11/2016 | Johnson | H04W 52/0209 |
| 2016/0378169 A1* | 12/2016 | Naeimi | G06F 1/3275 713/323 |
| 2017/0127622 A1* | 5/2017 | Hong | A01G 22/00 |

OTHER PUBLICATIONS

O'Leary, Precision Farming—Sensor Analytics, IEEE, 5 pages, 2015.*

Staniec et al, Telecommunication Platforms for Transmitting Sensor Data over Communication Networks—State of the Art and Challenges, Sensors, 20 pages, 2016.*

* cited by examiner

POWER EFFICIENT BASE STATION

CROSS REFERENCE TO RELATED APPLICATIONS

This application is a continuation application and, pursuant to 35 U.S.C. § 120, is entitled to and claims the benefit of earlier filed application U.S. application Ser. No. 15/487,161, filed Apr. 13, 2017, the content of which is incorporated herein by reference in its entirety for all purposes.

BACKGROUND

The Internet of Things (IoT) service and device market is rapidly expanding. The number of IoT connected devices is expected to number in the tens, or even hundreds, of billions within the next several decades. The range and number of Internet or "cloud" based services that utilize IoT connected devices is also expected to expand rapidly.

A key challenge in providing services to IoT connected devices is the need to provide services in remote areas that lack good Internet connectivity and other infrastructure services such as electrical power grids. For example, electrical power availability is often unreliable in geographically remote areas where cloud based services could prove useful. Unreliable electrical power availability is also common in developing countries where cloud based services could also prove useful. This forces reliance on other power sources such as solar, wind and/or battery powered sources to provide power for these remote IoT devices and networks.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure provide implementations of base stations for use with Internet of Things (IoT) (i.e., "cloud") connected networks in settings where electrical power from a power grid is either unavailable or only intermittently available to the base stations and/or network. For example, implementations of the base stations have use in cloud connected networks in remote locations where a power source for the base station may be constrained or limited. A base station according to the implementations operates to optimize/minimize power consumption by the base station drawn from a power source. For example, the power source may be a solar panel, wind generator, and/or battery. Several implementations of the base stations may be configured to provide advantages useful for conserving network power in situations where connectivity to the internet for a cloud connected network is only available intermittently, and/or is only available with poor quality or low speed/low bandwidth connections.

An implementation of the embodiments may comprise a solar panel/back-up battery powered base station that includes a first module for communicating with a gateway/network that is connected to the cloud. The first module may communicate with the gateway/network using a wireless protocol such as, for example, a Wi-Fi protocol using television white space (TVWS) frequencies. The base station may also include a second module for communicating with at least one data collecting device such as a sensor using, for example, a Wi-Fi protocol in the 2.5 GHz/5 GHz frequency bands. The base station may function to collect data from the data collecting devices, store the collected data in a base station cache, and transfer the data to the gateway/network for sending to the cloud. The base station may also function to receive control data from the gateway and also send appropriate control signals to the data collecting devices. In one implementation, the base station may include a third wireless module, such as a Wi-Fi module, that provides a wireless connection for mobile devices in the area of the base station to allow a mobile device to be used to send control signals to the base station and/or data collecting devices. The third module may also allow a user of a mobile device to access the cloud through the base station and the gateway/network. The third module may be configured as one and the same with the second module if the second module is using an appropriate Wi-Fi protocol.

The base station of the implementation determines a power budget for power provided by the solar panel/back-up battery power source of the base station over a time period. For example, in one implementation a 24 hour time period may be used as the time period. Based at least on the power budget and data associated with power consumption by the various components of the base station, the base station determines power efficient on/off duty cycles for the various base station components over the time period. In determining the on/off duty cycle, the base station determines a set of synchronizations to be performed according to a synchronization duty cycle using the first module to transfer/send the collected data in the base station cache to a gateway. The gateway may then synchronize the data to the cloud. The base station also determines a data collection duty cycle for the second module to be used to collect data for the base station cache from the data collecting devices. In the determination, each of the set of synchronizations may be prioritized relative to one another to allow high priority data to be synchronized to the cloud on a priority basis. The data collection duty cycle may also be determined based on relative priorities of the data collecting devices. The power consumption determination for the time period may include accounting for the power used by the first module during synchronization, the power used by the second module during data collecting, the power used by the third module to allow mobile devices to communicate with the base station, the power loss to battery leakage, and the power consumption of base station circuitry. The power consumption determination may also include accounting for a surplus/deficit of battery power that remains from a previous time period. In implementations, the duty cycling of the base station may be adjusted based on a predicted weather forecast. Also, the base station may be configured to seamlessly power on when mobile devices users are in proximity to the base station to allow the users to connect their devices the Internet/cloud. The base station may also be configured to powers off when mobile device users move out of proximity to the base station.

In other implementations, the power source may comprise a wind generator/back-up battery and the base station may determine a power budget based on the power provided by the wind power generator/back-up battery power source of the base station. In further implementations, the power source may be any other type of power source, for example, a solar panel or wind power generator used without battery backup, or a battery used alone by itself, or power from a power grid that is intermittent/unreliable and backed up by a battery.

DETAILED DESCRIPTION

Figure 1A:
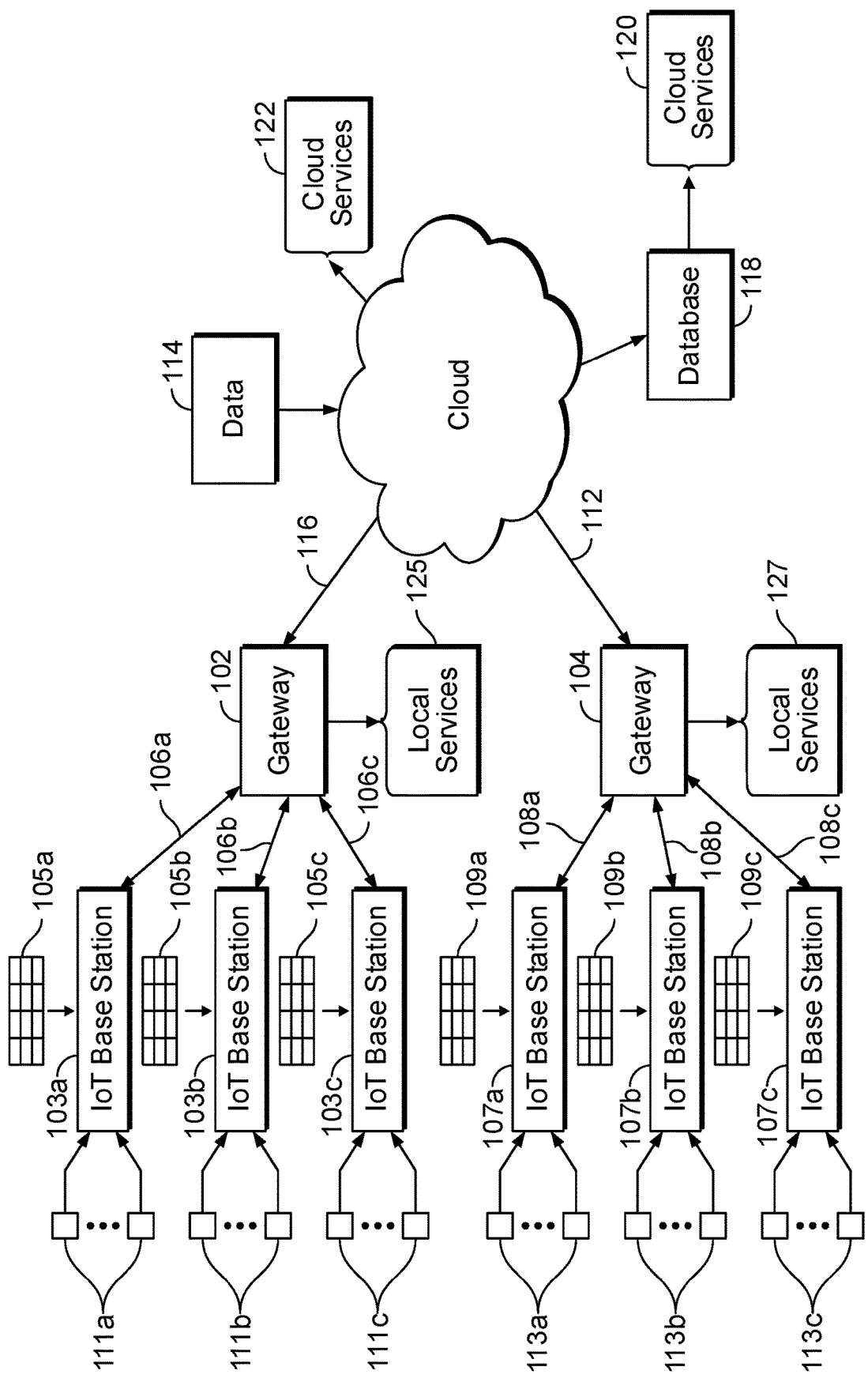
FIG. 1A is a simplified diagram illustrating an example system including a power efficient base station according to the embodiments.

The system and method will now be described by use of example embodiments. The example embodiments are presented in this disclosure for illustrative purposes, and not intended to be restrictive or limiting on the scope of the disclosure or the claims presented herein.

Most Internet of Things (IoT) networks/services that collect and/or process data are heavily dependent on connection to the cloud for providing service however remote the network may be located. For example, an IoT network/ service may comprise a network including remotely situated data collecting devices used for agricultural, mining, mapping, or other remote data gathering applications. The data collecting devices may each be paired with one or more a remotely placed base stations to communicate with the data collecting device to transfer the collected data to other network apparatus, such as a gateway, and then to the internet. Due to the lack of power in a remote area in which the base stations are situated, these types of base stations may be powered by, for example, battery-backed solar power.

While the cloud connected IoT model for networks/ services usually works well for connected homes or enterprises, the model often fails to provide adequate service in settings where electrical power may be limited. For example in remote locations where solar panels and/or batteries must be relied over a long time period as a power source for data collecting devices, base stations, and gateways, etc., service may be severely degraded by power source disruptions. Also, if a remote network relies on solar power or wind power, the availability of the power may be adversely affected by weather conditions.

Furthermore, sending large data files such as videos over an Internet connection from a remote location may consume valuable power and take large amounts of time to transfer. For example, these problems may be especially acute for IoT applications that use high volume data collecting devices such as UAVs that collect video data. A typical high definition UAV video made during a 15 minute flight can commonly exceed a gigabyte (GB) in size. Sending an entire video of this size over an Internet connection through a base station in the local network for processing in a cloud network may take a long time and consume a large amount of power to maintain the internet connection. Services that utilize the video may then be degraded as far as uptime, service latency and quality of service from adverse effects caused by power source conditions. Other services relying on the same internet connection in similar power conditions may also be degraded when large video or data files are sent.

The embodiments of the disclosure provide methods and apparatus that allow efficient provision of services in a local network including remote base stations that collect data from one or more remote data collecting devices. The remote base stations may be connected to a cloud network through a gateway. The remote data collecting devices may include data sensors such as heat sensors, infrared sensors, moisture sensors, motion sensors, stationary cameras, chemical sensors, or any other type of sensor configurable to provide data about an environment to the gateway. The base station may also be configured to receive data from data sensors implemented in moving vehicles or remote controlled vehicles. For example, the local network may be configured to receive video data from a video camera implemented in a drone, i.e., an unmanned aerial vehicle (UAV).

Use of implementations of the embodiments of the base station in an IoT network provides an advantage over existing IoT networks. The base station allows a network to operate with negligible downtime. For example, when there is an outage (for example, due to power grid power loss), data collection at the base stations from the sensors does not stop and the platform continues to deliver services as the network relies on its solar/battery-backed solar power source, or other type of power source.

Also, due to the base station being powered by battery-backed solar power in varying weather conditions in which cloudy weather can reduce solar power output significantly and drain the batteries of the base station, the base station may operate as a weather-aware base station design. For example, the base station may uses weather forecasts to appropriately duty cycle different components of the base station. Adding weather awareness into the IoT base station may significantly reduce the base station downtime (and therefore network down time) as compared to conventionally deployed base stations.

In an implementation, the base station utilizes the different duty cycle requirements of each of multiple base station components to efficiently consume power when performing its operations. For example, in an agricultural/farm setting a farmer is typically inactive at night and is unlikely to check the collected farm data at the gateway of a network. In this scenario, the base station modules that send the collected farm data from the base station to the gateway of the network may be turned off to allow the base station to conserve power while still collecting data from data sensors in a cache using other modules to receive data from the data sensors. The agricultural implementation also allows the farmer to turn the base station on and off in a power efficient way to access Wi-Fi through the gateway for productivity applications while the farmer is on the farm. For example, the base station may be configured to seamlessly power on Wi-Fi access when the farmer, as a mobile devices user, is in proximity to the base station to allow the farmer to connect a device to the Internet/cloud. The base station may also be configured to power off Wi-Fi access when the farmer, as a mobile device user, moves out of proximity to the base station.

In an implementation, the base station includes a synchronization module that allows the base station to send collected data from a cache to a network gateway, which then, sends it up to the cloud. The synchronization module may be, for example, a module operating in the television white space (TVWS) frequencies. The base station also includes a sensor connectivity module that establishes a connection between the base station and the data collecting devices (sensors) deployed to collect data for the network. The sensor connectivity module may be, for example, a Wi-Fi router. A sensor connectivity module of this type may have lower power requirements than the synchronization module. The base station may also include a base station controller that is responsible for two functions. First, it serves as a cache for the sensor data collected by the sensor module and syncs the data with the IoT gateway when the TVWS device is switched on using the synchronization module. Second, it plans and enforces the duty cycle rates of the sensor connectivity module and synchronization module in a power efficient way depending on the current power available to the base station and the weather conditions.

Other implementations allow different types of data that is to be transferred from the data collection devices to the cloud network to be assigned different priorities and transferred on a priority basis based on available power for the base station. For example, a priority of non-time sensitive, intermediate-time sensitive, or time sensitive may be assigned to collected data according to task/service criticality or desired service latency. This allows the most critical data of data collection services being performed to be communicated between the data collecting devices and the base station on a priority basis based on available base station power, and then transferred to the network gateway and the cloud.

The advantages described above also are applicable in other implementations, where the power source may be any other type of power source. For example, the power source may comprise a wind power generator/battery back-up, a solar panel or wind power generator used without battery backup, a battery used alone by itself, or power from a power grid that is intermittent/unreliable and backed up by a battery.

FIG. 1A is a simplified diagram illustrating an example system including a power efficient base station according to the embodiments. FIG. 1A shows a system 100 that includes gateways 102 and 104, base stations 103a-103c, base stations 107a-107c, data collecting devices 111a-111c, and data collecting devices 113a-113c. In the implementation of FIG. 1A, base stations 103a-103c and base stations 107a-107c may be configured as power efficient base stations according to the embodiments. Base stations 103a-130c may include solar panels 105a-105c, and, base stations 107a-107c may include solar panels 109a-109b, respectively. Gateways 102 and 104 may be configured to communicate with a cloud network 116 over, respectively, links 110 and 112 and provide local services 125 and 149. Links 110 and 112 may each comprise, for example, a hypertext transfer protocol (HTTP) or advance messaging queuing protocol (AMQP) connection implemented over a local internet/cloud interface such as a Wi-Fi connection. Gateway 102 may receive data 106 from base stations 103a-103c over wireless interfaces 106a-106c implemented using for example, television white space (TVWS) spectrum, Wi-Fi spectrum, or any other suitable wireless spectrum. Gateway 104 may receive data 108 from base stations 107a-107c over wireless interfaces 108a-108c implemented using for example, television white space (TVWS) spectrum, Wi-Fi spectrum, or any other suitable wireless spectrum. Use of TVWS spectrum, which is in the lower frequencies, allows signals to propagate much farther than signals in 2.4 GHz or 900 MHz of the spectrum. TVWS signals also may propagate through the leaves and crop canopies of a remote environment. Data collecting devices 111a-111c, such as cameras, sensors or sensor equipped UAVs, may communicate data to base stations 103a-103c, respectively, using protocols such as MQ telemetry transport (MQTT), transport control protocol (TCP), or file transfer protocol (FTP), depending on the configurations of the particular cameras, sensors or UAVs that are used. Data collecting devices 113a-113c, such as cameras, sensors or sensor equipped UAVs, may communicate data to base stations 107a-107c, respectively, using protocols such as MQ telemetry transport (MQTT), transport control protocol (TCP), or file transfer protocol (FTP), depending on the configurations of the particular cameras, sensors or UAVs that are used.

In the example of FIG. 1A, the gateway 102, base stations 103a-103c, and data collecting devices 111a-111c may comprise one local network, and, gateway 104, base stations 107a-107c, and data collecting devices 113a-113c may comprise another local network.

In an implementation of system 100, each of gateways 102 and 104 may comprise a gateway that is located in a weakly connected setting, i.e., in a setting in which connections over the local internet/cloud interface for links 110 and 112 are only available intermittently, and/or are only available with poor quality, or low speed/low bandwidth connections. Gateways 102 and 104 may be located remotely from one another. Base stations 103a-103c and 107a-107c may be also located remotely, and dispersed in a manner that allows base stations 103a-103c and base stations 107a-107c to collect data from data collecting devices 111a-111c and 113a-113c, respectively. Each of gateways 102 and 104 may provide services 125 and 149, respectively, though user interfaces and/or connected devices for users located in the service area of the particular gateway. The services 125 and 149 may include local services that do not require communication with cloud network 116. Base stations 103a-103c and base stations 107a-107c may also be configured to allow users that are in proximity to one of the base stations to access to local services 125 and 149, respectively, though a wireless connection, for example Wi-Fi, with a base station using a mobile device. The services 125 and 149 may also include local services that require communication with cloud network 116. Use of data from gateways 102 and 104 may also enable creation of data base 118 and provision of cloud services 120 and 122 to users located throughout system 100 remotely from gateways 102 and 104. Services 120 and 122 may also be used by users located in the service area of one of the particular gateways 102 or 104 through data communications between gateway 102 and cloud network 116. For example, data that is communicated to the cloud network 116 from gateway 102 may be combined with data from gateway 104, and other similar gateways, in the cloud network 116 in order to provide enhanced cloud based services 120 and 122 to the users located in the service areas of each gateway 102 or 104. Cloud service 120 and 122 may also be provided to users located remotely from gateways 102 and 104. For example, base stations 103a-103c and base stations 107a-107c may also be configured to allow users that are in proximity to one of the base stations to access to cloud services 120 and 122 though a wireless connection, for example Wi-Fi, with a base station using a mobile device.

Data that is communicated to the cloud network 116 from gateways 102 and gateway 104 may also be combined with other data 114, such as weather data, in the cloud network 116 in order to provide the enhanced cloud based services 120 and 122.

Implementation of example base stations 103a-103c and 107a-107c in system 100 has application in situations in remote locations where there is no electrical power grid available to supply power to network devices, such as the base stations, and only a weakly connected communications interface available for connecting the gateway to the cloud. In these situations the base stations may be powered by a solar panel or a battery-backed solar panel combination. The implementations provide a power efficient base station that provides an advantage in situations where, for example, access to allow frequent changing of batteries is difficult and/or long periods of rainy/cloudy weather adversely affect the charging capabilities of the solar panels. These situations may also include situations in which the network is operated in a remote location within which only intermittent or low quality/low bandwidth data connections are available, or where high quality/high bandwidth data connections are prohibitively expensive and data collection needs to be prioritized based on power consumption considerations. For example, system 100 may have application for use in providing services to operations such as mining, mapping, geographical research, space research, oceanography, environmental research, forestry, security, surveillance, or agriculture. In other implementations any of the solar panels 105a-105c, and solar panels 109a-109c, may be replaced with any other appropriate type of power source, for example a wind power generator.

Figure 1B:
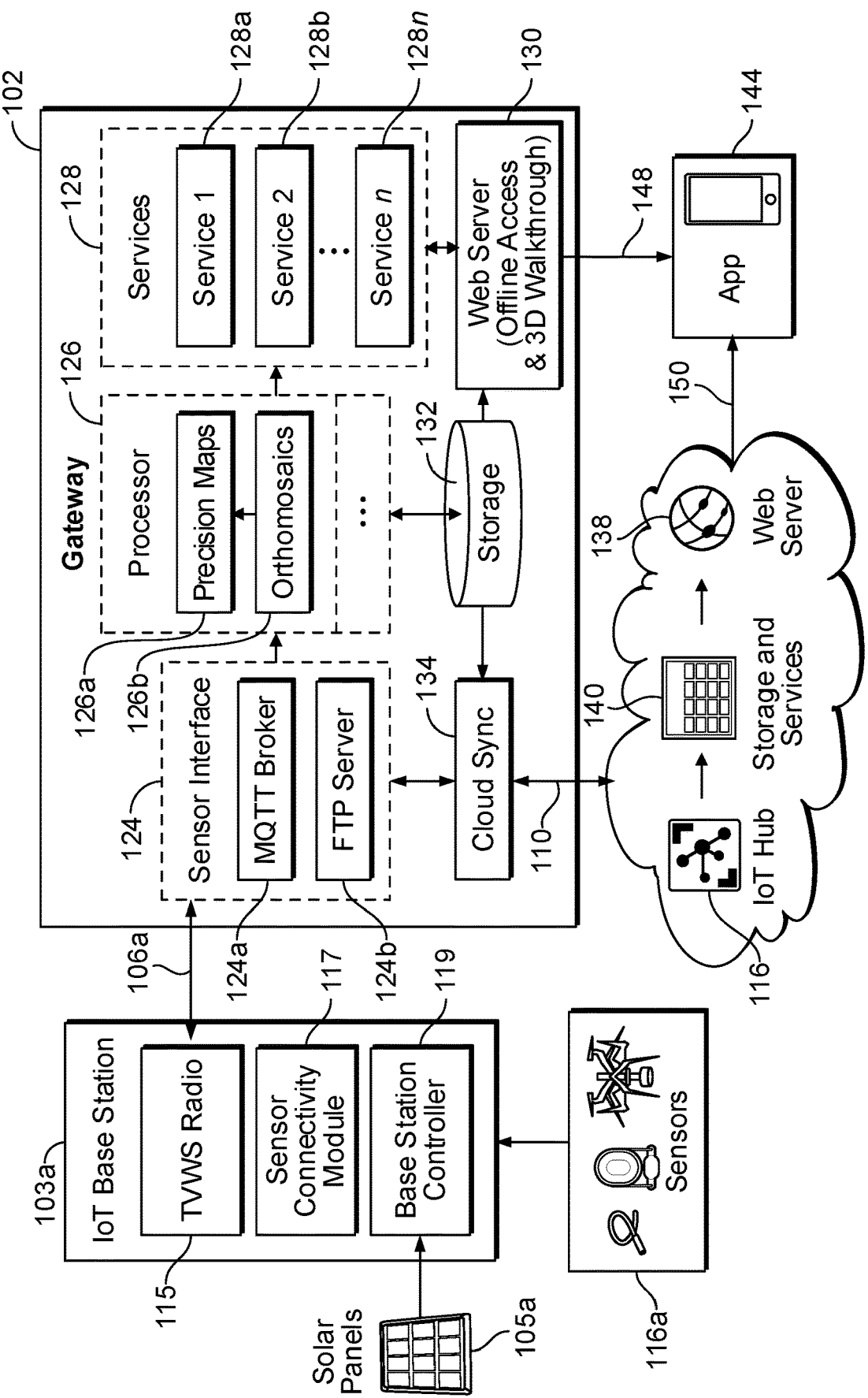
FIG. 1B is a simplified diagram illustrating an implementation of a base station for communicating with example data sensors and an example gateway.

FIG. 1B is a simplified diagram illustrating an implementation of a base station 103a for communicating with example data sensors 116a and an example gateway 102. Base station 103a of FIG. 1B illustrates an example implementation of base station 103a of FIG. 1A. Bases stations 103b-103c and base stations 107a-107c may be similarly implemented. Gateway 102 of FIG. 1B illustrates an example implementation of gateway 102 of FIG. 1A. Gateway 104 may be similarly implemented.

Base station 103a may include TVWS module 115, sensor connectivity module 117, and base station controller 119. TVWS module provides an interface between base station 103a and sensor interface 124 of gateway 102 over wireless link 106a. Sensor connectivity module 117 provides a Wi-Fi interface for connections from sensors 116a and other devices. In the implementation, use of a Wi-Fi interface for sensor connectivity module 117 ensures that the base station may be connected to most off-the-shelf sensors, cameras and drones. The Wi-Fi interface also functions as a device connection module that allows users to access network productivity applications and the internet using their mobile devices. Base station 103a may also include one or more solar panels 105a that provide power to base station 103a. A chargeable battery-backup power supply may also be configured in base station 103a and used in combination with solar panels 105a to provide power at times in which no solar power is available.

Gateway 102 may include sensor interface 124, processor 126, service functions 128, web server 130, storage 132, and cloud sync 134. Sensor interface 124 includes MQTT broker 124a for communicating with one or more base stations, such as base station 103a, over a MQTT link 106a. Sensor interface 124 may also include FTP server 124b for receiving video files from a one or more base stations over FTP link 106a.

Webserver 130 of gateway 102 may be connected to one or more devices 144 through, for example, a Wi-Fi link 148 to allow gateway 102 to provide local network services to a user of devices 144 without requiring a cloud connection (i.e., while offline). The one or more devices 144 may include applications, for example an unmanned aerial vehicle (UAV) flight planner, to control a UAV carrying a camera of sensors 116a that collects videos. Gateway 102 also may be connected by IoT Hub 116 to the cloud network though HTTP/AMQP link 110. The Cloud network 116 may provide cloud services, such as services 120 and 122 of FIG. 1A, based on the data received from gateway 102 and/or received from other gateways. Devices 144 may also provide users access to a remote webserver 138 to allow users to access services 120 and 122 provided by the cloud network 116 when internet/cloud connections are available. The link 150 from devices 144 to webserver 138 may be implemented over the same local Wi-Fi internet/cloud interface as is HTTP/AMQP link 110. Cloud network 116 may also include a connection to a global storage 140 that stores data for use by services 128.

In an example implementation, base station 103a and gateway 102 may be implemented as part of a local network in an agricultural service setting. In the agricultural service setting, base station 103a may receive and collect data from sensors 116a and gateway 102 may be implemented as a gateway connecting the local network to the internet/cloud. In one example implementation, the local network may provide agricultural services to the owner of a farm within which the local network including base station 103a and gateway 102 is configured. The local network may include other base stations and gateways as is shown, for example, in FIG. 1A.

The local network may be configured for efficient and reliable provision of services despite a lack a consistent solar power, inability to make frequent battery changes, lack of inexpensive internet/cloud connectivity in the fields, and despite a slow and unreliable network connection to cloud network 116 from gateway 102. Data collection from sensors 116a, and sending of the collected data to gateway 102 and/or the cloud, may be performed based on base station controller 119 controlling the on/off duty cycles of the modules of base station 103a in a power efficient manner. Base station controller 119 may store the collected data in cache for time periods consistent with the module on/off duty cycling. Services may be provided using a task allocation and data transfer scheme between gateway 102 and cloud network 116 that allows for efficient provision of both local services 125, and cloud services 120 and 122 in the setting based on data collected by sensors 116a. Processor 126 of gateway 102 may construct a dynamic, precision map 126a using orthomosaic function 126b that captures and presents the temporal variations of various environmental parameters on an area of land on a farm. Various sets of data may also be backed up in storage 132 for sending to the cloud network 116 to enable cross-farm (i.e., between different farms) and long-term analytics performed in the cloud network 116. The various sets of data may be queued for sending to the one or more cloud network base on assigned priorities that allow for efficient provision of both local 125 and cloud services 120 and 122 given the weakly connected setting. The task allocations and the various sets of data may be configured to avoid sending large data sets to/from the connected setting.

In an implementation, sensors 116a may include environmental sensors of a farm network deployed throughout an area of the farm such as in crop fields or livestock grazing areas. The sensors 116a may include a camera equipped UAV deployed to flyover the crop fields or livestock grazing areas to take aerial view videos of the area. In one implementation, the environmental sensors and UAV may communicate on Wi-Fi channels using sensor connectivity module 117 over link 129 to base station 113a which relays the data to gateway 102 over channels in the television white space (TVWS) using TVWS module 115. Gateway 102 may be implemented as a PC form factor device and be placed in the farmer's house or office within a location with internet access to the cloud. To avoid sending entire UAV generated videos to the cloud, and for a low-latency response, the gateway 102 may perform significant local computation.

Figure 2:
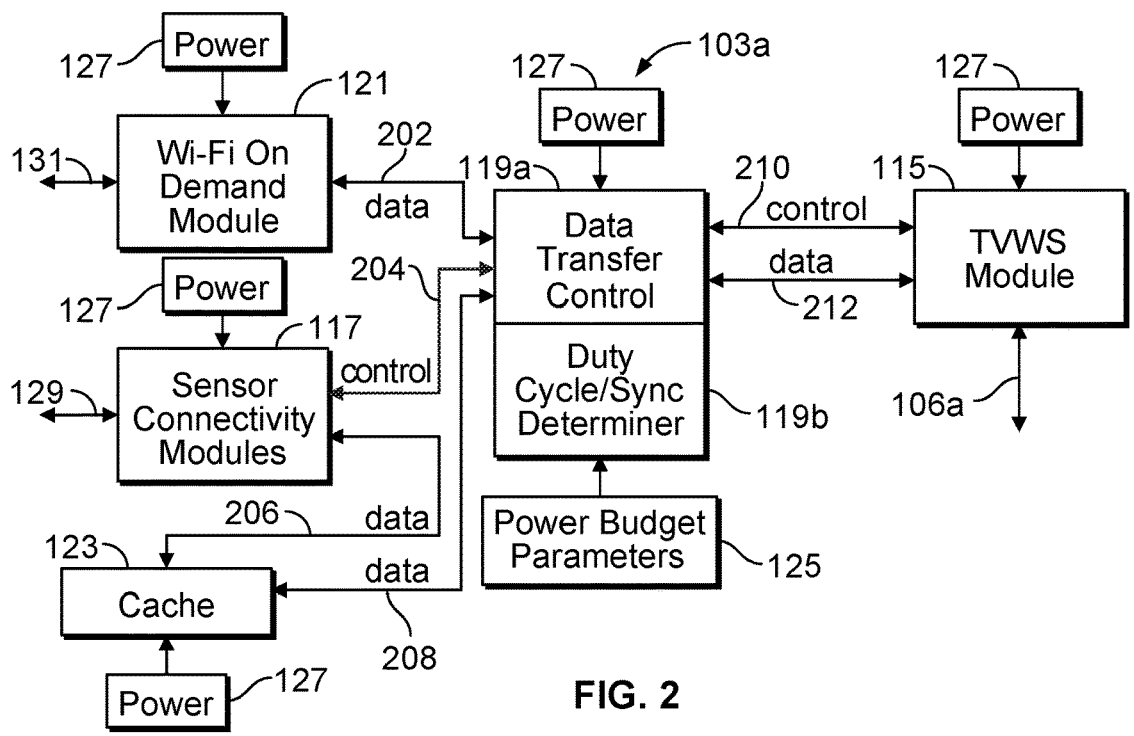
FIG. 2 is a simplified block diagram illustrating functional blocks of an implementation of a base station.

FIG. 2 is a simplified block diagram illustrating functional blocks of an implementation of a base station. FIG. 2 may represent an example implementation of base station 103a of FIGS. 1A and 1B. Bases stations 103b-103c and base stations 107a-107c may be similarly implemented.

Base station 103a includes base station controller 119 that comprises data transfer controller 119a and duty cycle/sync determiner 119b. Base station 103a further includes cache 123, TVWS module 115, Wi-Fi on demand module 121, and sensor connectivity module 117. Power function 127 may represent a combined battery-backed solar pane power source that provides power to each portion of base station 103a. In other implementations, power source 127 may be only a solar panel, or only a battery source, or may represent any other way of sourcing power that may be enhanced by use of a power efficient base station. TVWS module 115 includes the functions that provide the interface to gateway 102 over wireless link 106a. Wi-Fi on demand module 121 provides a Wi-Fi connection to devices located in proximity (within the coverage range) of base station 103a on wireless link 131, and sensor connectivity module 117 provides the interface to sensors 116a over wireless link 129. In an implementation, Wi-Fi on demand module 121 and sensor connectivity module 117 may be implemented as one and the same module.

Data transfer controller 119a manages overall coordination between TVWS module 115 and sensor connectivity module 117 in order to transfer data collected from sensors 116a to gateway 102 in a power efficient manner. In order to manage the coordination between modules, data transfer controller communicates control signals to TVWS module 115 over link 210, and communicates control signals to sensor connectivity module 117 over link 204. Data transfer controller 119a may use control data provided by duty cycle/sync determiner 119b to control the duty cycles of TVWS module 115 and sensor connectivity module as used to transfer data. Duty cycle/sync determiner 119b may receive control data/information from power budget parameters data base 125 to generate the control data to control data transfer control 119a. Power budget parameters 125 may comprise a database of parameters related to power consumption by the components of base station 103a, weather forecasts, estimated use of base station 103a for Wi-Fi access, and base station operating parameters associated with past use, and/or timing/priorities for data collection from data sensors 116a and for data synchronization to the cloud. Sensor connectivity module 117 collects sensor data from sensors 116a and stores the sensor data in cache 123 using link 206. The sensor data may then be transferred to TVWS module 115 over data link 208 by data transfer controller 119a and based on the duty cycles of TVWS module 115. Wi-Fi on demand module 121 sends/receives device data to data transfer controller 119a on link 202, which then sends/receives the device data to/from the gateway/cloud using TVWS module 115. Again, Wi-Fi on demand module 121 and sensor connectivity module 117 may also be implemented as one and the same module.

Base station 103a may be duty cycled to explicitly account for weather forecast, available solar power, and current charge state of the batteries. Two aspects of the base station make the duty cycling challenging: a) the sensor connectivity module 117 has significantly lower power requirements than the TVWS module 115. Efficient use of power needs efficient proportion of power use between the sensor connectivity module 117 and the TVWS module 115 to achieve optimum performance, and, b) base station 103a allows a user, such as a farmer, to manually turn on the base station 103a (or, alternatively, base station 103a may automatically turn on) to connect to the Internet to allow the user to use productivity apps on their phone. These two factors add a variable component to base station power consumption. The key goals for the operation of base station 103a include energy neutrality, where the duty cycling aims to achieve the objective of energy neutrality. For a given planning period, a goal may be set to consume at maximum as much power as can be harvested from the solar panels. Other goals may be set for the operation such as including allowance of variable access, in which base station 103a allows a user to access Wi-Fi connectivity on-demand. For example, to conserve power expended providing Wi-Fi access, base station 103a may monitor for an indication of need for Wi-Fi access. If base station 103a determines that there is an indication of need for Wi-Fi access, base station 103a may ensure that the TVWS module 115 is on to provide Wi-Fi access. If base station 103a determines that there is no indication of need for Wi-Fi access, base station 103a may at least turn off the TVWS module 115 to conserve power when the TVWS module 115 is not in the on-time of the duty cycle and sending data to the gateway 102. In one example, base station 103a may monitor for an indication of possible need for Wi-Fi access by pinging mobile devices from the base station module that provides Wi-Fi access (either Wi-Fi on demand module 121 or sensor connectivity module 117, depending on the implementation) and determine that there is no indication of need for Wi-Fi access. The determination may be performed, for example, by determining from the ping response times that the mobile device has been in power saving mode for a predetermined period of time. Alternately, base station 103a may use other methods such as proximity detection through motion sensing.

The power consumption of base station 103a is therefore usage-driven and varies across days. Duty cycle planning must be performed to plan ahead for this variable delay. The key goals for the operation also include the minimization of data gaps. A "data gap" means a continuous time-interval with no sensor measurements available. Such gaps need to be minimized to avoid missing out on interesting data trends. Therefore, operation of base station 103a must include duty cycling that aims to minimize the length of the largest data gaps, under the constraints of energy neutrality and variable access.

Figure 3:
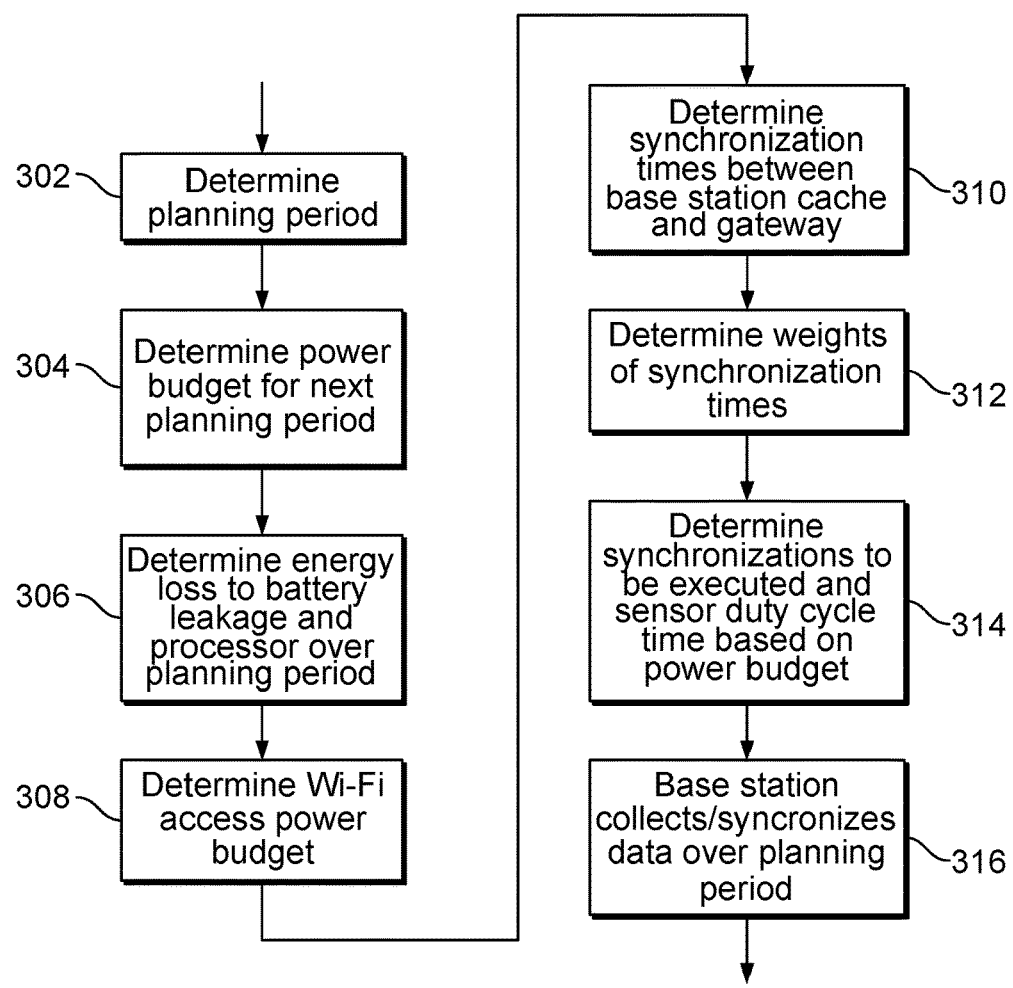
FIG. 3 is flow diagram illustrating operations performed in an example base station for determining power efficient on/off duty cycle times.

FIG. 3 is flow diagram illustrating operations performed in an example base station for determining power efficient on/off duty cycle times. FIG. 3 may be explained with reference to base station 103a of FIGS. 1A and 1B, and FIG. 2.

In the implementations described for FIG. 3, Wi-Fi on demand module 121 will be considered as implemented as one and the same as sensor connectivity module 117. In these implementations, sensor connectivity module provides the functions for both data collecting from data sensors 116a and the provision of Wi-Fi access.

The process begins at 302 where duty cycle/sync determiner 119b of base station controller 119 determines a planning period, $T_p$. The planning period may be a value retrieved from power budget parameter database 125 that was input by a user. In an example implementation, a 24 hour planning period consistent with the sun rising and setting may be used. In other implementations, any other appropriate planning period that allows desired data collection may also be used. For example, in an implementation in which a base station is powered only by a battery, the planning period may be based on an initial battery power and an estimated battery life.

Next at 304, duty cycle/sync determiner 119b of base station controller 119 determines the power budget for a next planning period. Because the sole power source for the base station is the set of solar panels 105a with a battery backup, the solar power output of the panels 105a and battery varies with the time of day and the weather conditions. Standard methods may be used to estimate the output of solar panels 105a, given the weather conditions. This energy output from the solar panels 105a over the next planning period may be defined as $S_I$. Because the estimation may not always be exact and there is usage variability, there may be some credit or debit of power from the previous planning period. This credit may be defined as $C_I$. Therefore, the total power budget for base station 103a over the next planning period is $S_I + C_I$. This formulation absorbs the variability in on-demand Wi-Fi usage patterns into the power budget determination. If the on-demand Wi-Fi usage patterns are stable, the term CI goes down to zero.

Next, at 306, duty cycle/sync determiner 119b of base station controller 119 determines the average energy loss due to battery leakage and the processor/circuitry of base station controller 119 during one planning period, $T_p$. This may be defined as $E_D$.

Next, at 308, duty cycle/sync determiner 119b of base station controller 119 determines a Wi-Fi access power budget. This Wi-Fi access power budget accounts for the power used for on-demand Wi-Fi access by a user over the planning period, $T_p$. To determine this, a fixed time budget of $T_V$ is allocated for Wi-Fi access. In the implementation of FIG. 3, Wi-Fi access will use connections provided by both of the TVWS module 115 and sensor connectivity module 117 (functioning as the Wi-Fi on demand module). If the power consumption of the TVWS module 116 is defined as $P_T$ and the power consumption of the sensor connectivity module is defined as $P_S$, then, we need to allocate $T_V(P_T+P_S)$ for variable Wi-Fi access. If the Wi-Fi access was provided by a separate module such as Wi-Fi on demand module 121 shown in FIG. 2, a power consumption of that module may be used in place of $P_S$.

Next at 310, duty cycle/sync determiner 119b of base station controller 119 determines a set of desired synchronization times for the base-station to synchronize with the gateway 102. In these synchronizations, TVWS module 115 is used to sync the collected sensor data stored in the base station cache with the gateway. To determine the synchronization time, base station 103a may retrieve a schedule, S, from power budget parameter database 125. The schedule, S, includes a set of desired synchronization times for the base-station to synchronize with the gateway. The schedule, S, may be used as a basis for determining the duty cycling for the TVWS module 115. The schedule, S, may depend on the usage patterns and sensor types of the particular application/network in which base station 103a is implemented. The schedule, S, may be either manually programmed or automatically inferred, for example, from past usage data.

At 312, duty cycle/sync determiner 119b of base station controller 119 determines a set of weights of the synchronization times in the schedule, S. The synchronization times in the set S each have a corresponding weight from a set of weights given by the set W. Each weight in the set W may correspond to a relative priority of an associated synchronization time. For example, in an agricultural application, a high-weighted synchronization time may be sunrise, as that is when a farmer begins their day. Thus, the farmer would like to access the latest sensor data when the activities of the day are planned. By incorporating flexibility in the synchronization times between the gateway and the base station 103a, and weighting of the synchronization times, the network can adapt to data collecting applications having different requirements.

Next, at 314, duty cycle/sync determiner 119b of base station controller 119 determines the synchronizations of the set S to be executed by TVWS module 115 and duty cycle times of sensor connectivity module 117 based on the power budget, SI+CI, for the next planning period, the energy loss to battery leakage and processors/circuitry, $E_D$, for the next planning period, and the Wi-Fi access power budget, $T_V(P_T+P_S)$, for the next planning period. The synchronizations of the set S to be performed may be defined as the set $S_1$ and the duty cycle time of sensor connectivity module 117 may be defined as $\gamma$, where $\gamma = T_{on}/T_{off}$, for sensor connectivity module 117.

Next, at 316 data transfer control 119a of base station controller 119 controls sensor connectivity nodule 117 to collect data from sensors 116a according to the determined duty cycle time, $\gamma$, and store the collected data in cache 123 of sensor connectivity module 117. Data transfer control 119a also controls TVWS module 115 to transfer the stored data in the cache to gateway 102 according to the determined synchronization set $S_1$. Gateway 102 may then synchronize the collected data in the cloud.

Figure 4:
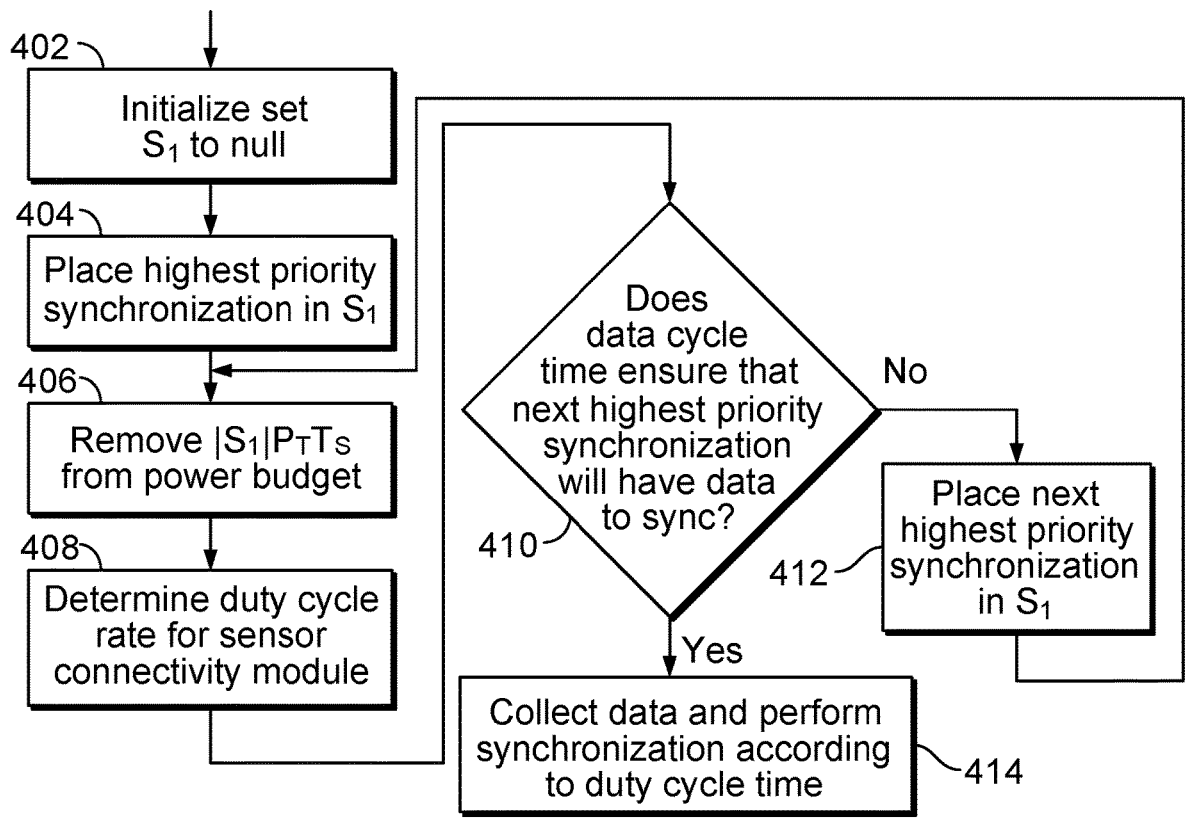
FIG. 4 is flow diagram illustrating operations performed in an example base station for determining a power efficient set of data synchronizations over a time period.

FIG. 4 is flow diagram illustrating operations performed in an example base station for determining a power efficient set of data synchronizations over a time period. In an implementation of base station 103a, the operations of FIG. 4 may be performed at operation 314 of FIG. 3.

At 402, duty cycle/sync determiner 119b initializes the set $S_1$ as a null (empty) set. At 404, duty cycle/sync determiner 119b adds the highest priority synchronization of S to $S_1$. Then it subtracts $|S_1|P_T T_S$ from the power budget, where |.| denotes set cardinality and $T_S$ denotes the time to perform a synchronization operation using TVWS module 115.

At 408, duty cycle/sync determiner 119b determines the duty cycle rate for the sensor connectivity module that corresponds to the current set Si. As described above the duty cycle is defined as $\gamma = T_{on}/T_{off}$.

At 410, duty cycle/sync determiner 119b determines whether the duty cycle rate determined at 408 ensures that the next highest weighted sync in S will have additional data from the sensors to synchronize with gateway 102. If the determined duty cycle rate for the sensor connectivity module 117 ensures that the next highest weighted synchronization in S will have additional data from the sensors to synchronize with the gateway, the process moves to 412 and duty cycle/sync determiner 119b adds this next priority synchronization operation to the set $S_1$. Operations 406, 408, 410 and 412 will then be repeated while adding synchronizations to $S_1$ in decreasing order of weights until it is determined at operation 410 that none of the synchronizations in $S_1$ will have new data to share based on the duty cycle. When it is determined at 410 that none of the synchronizations in S1 will have new data to share, the process will move to operation 414, which may then be performed as operation 314 of FIG. 3. As more synchronizations operations are added to set S1 during operations 406, 408, 410 and 412, the power budget for the sensor connectivity modules decreases. With a lower power budget, the sensor connectivity module can collect data from the sensors less often and hence it becomes less likely for frequent synchronizations to see new data. Thus, the process of FIG. 4 regulates and balances the synchronization operations between gateway 102 and base station 103a.

To determine the duty cycling rate $\gamma=T_{on}/T_{off}$ for sensor connectivity module 117 at operation 408, the energy expenditure of the system may be defined as $E_D+(P_S+P_T)Tv+P_T T_S |S_1|+P_S T_p \gamma$. Since the goal of the planning algorithm is to estimate $T_{on}$ and $T_{off}$ such that the energy expenditure does not exceed the energy budget during the planning period, this imposes the following constraints:

$$S_1+C_1 \geq ED+(P_S+P_T)T_v P_T T_S |S_1|+P_S T_P \gamma === \geq \gamma \leq ((S_1 I+ C_1 I-ED-(P_1 S+P_1 T)T_1 V-P_1 TT_1 S|S_1 I|)/(P_1 ST_1 P)$$

$T_{connect}$ may be defined as the time taken for the sensor connectivity module to turn on and establish a connection to the sensors. Further, $T_{sensor}$ be defined as the time that it takes for all the sensors communicating with sensor connectivity module 117 to wake up and transmit to the base station. Since the ON time of sensor connectivity module 117 has to be long enough for the all the sensors to be able to communicate their data to base station 103a, this imposes a further constraint:

$$T_{ON} \geq T_{connect}+T_{transfer} = \geq \gamma T_{off} \geq T_{connect}+T_{transfer}$$

Since a goal of the process is to minimize the data gap under the power constraints imposed by the two equations above, it is attempted to minimize $T_{off}$.

Figure 5:
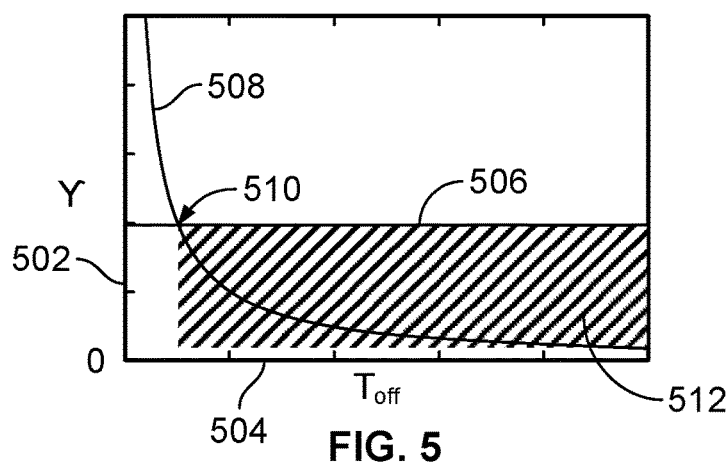
FIG. 5 is a plot showing duty cycle rate, $\gamma$, versus duty cycle on time, $T_{on}$, for an example base station.

FIG. 5 is a plot showing duty cycle rate, $\gamma$ on axis 502, versus duty cycle on time, $T_{on}$ on axis 504, for an example base station The inequalities from the two above equations define a convex region in the 2-dimensional space in the plot of $\gamma$ versus $T_{off}$, which is shown as the shaded region 512 in FIG. 5. Since the cost function $T_{off}$ is linear, the minimum occurs on a corner 510 of the intersection region defined by the two inequalities 506 and 508. The minimum latency is achieved when the two inequalities are exactly met.

In the implementation describer for FIGS. 3 and 4, the duty cycle off time for sensor connectivity module 117 is set to be less than $T_{transfer}$ to ensure that the sensors 116a can transfer data when the sensor connectivity module 117 is on. An alternative implementation would allow base station 103a to send wake-up times to sensors to conserve sensor power. The implementation described for FIGS. 3 and 4 is suitable for use with very low-power sensors that may consume 3-4 orders of magnitude less power than a base station on average.

While the described implementations of base station 103a leverage the process described in FIGS. 3 and 4 to plan duty cycling for different components, base station 103a may also take weather into account in the planning. For example, a weather application may be installed on base station 103a and used by base station processor 119 to retrieve weather forecasts and plan the duty cycling scheme accordingly. For example, the weather forecast for the next 24 hours may be taken into account. In one implementation, the forecasted cloudiness percentage for time intervals (in hours) over the next 24 hours may be used.

Figure 6:
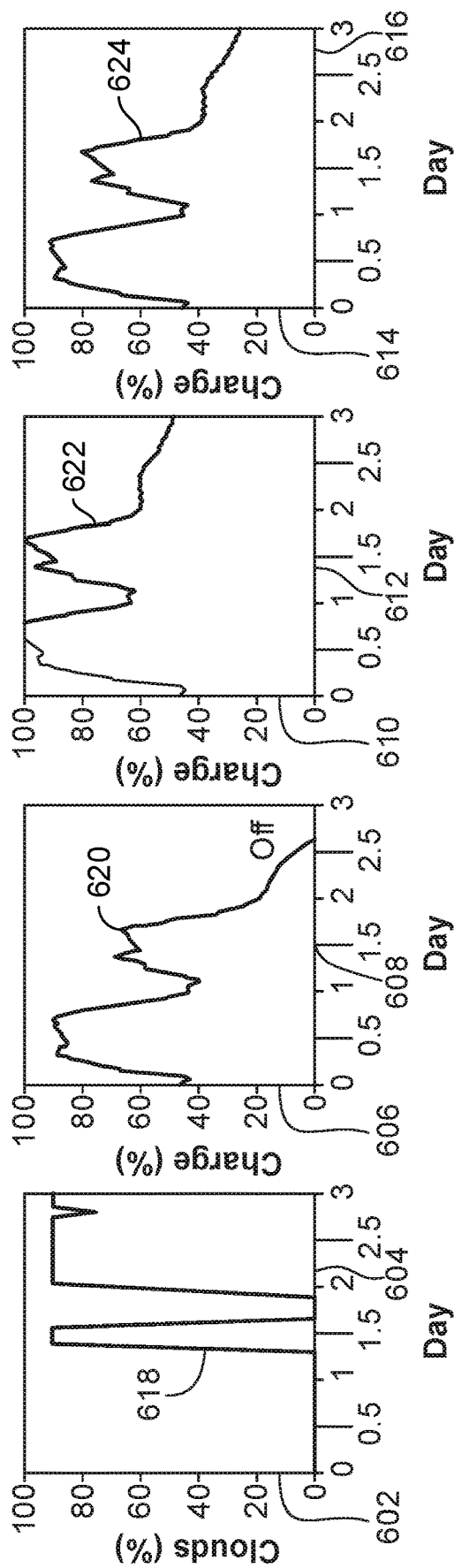
FIGS. 6A, 6B, 6C, and 6D are plots showing power savings in a base station using different duty cycles based on weather; and, FIG. 7 is a simplified block diagram illustrating an example base station.

FIGS. 6A, 6B, 6C, and 6D are plots showing benefits of power savings in a base station using different duty cycles based on weather. FIG. 6A shows an example of a forecast of the cloudiness percentage (shown by plot line 618) on axis 602 versus the days in the forecast period on axis 604. The start of each day may be defined as 6 AM local time. This set of three days may be used to compare example operation schemes for base station 103a by recording and comparing the state-of-charge of the solar power backed batteries in base station 103a. FIG. 6B shows a situation in which the base stations is always on. As shown in FIG. 6B, the battery charge (shown by plot line 620) on axis 606 versus the days on axis 608 goes up during a sunny day and down during the night as cloud percentage varies. In FIG. 6B, while the base station remains energy neutral during the first day, during subsequent days its battery drains because of cloudy weather, leading to base station 103a powering down and being unavailable on the third day. FIG. 6C shows battery charge (shown by plot line 622) on axis 610 versus the days on axis 612 for one alternative approach. For the 3 days shown in FIG. 6C, base station 103a may be set to a conservative duty cycling period. This ensures that base station 103a is available on cloudy days. However, in FIG. 6C, the base station battery charges up to 100% during the sunny days thus wasting solar power that could have been utilized. Also, because the duty cycling interval of base station 103a is conservative it collects less data than optimized duty cycling. FIG. 6D shows battery charge (shown by plot line 624) on axis 614 versus the days on axis 616 for another alternative approach. Base station 103a collects data on the first two days more frequently owing to high availability of solar power. However, on the third day, it switches to a more conservative duty cycling based on the forecast schedule to save power. A significant factor of the gain in data collection frequency achieved over a fixed duty cycle (comparison between FIG. 6C and FIG. 6D), is caused by TVWS module 115 being duty cycled at a different rate than the sensor connectivity module 117. Also, base stations not using duty cycling may face a large amount of downtime in a cloudy month as compared to a weather/power-aware base station according to the disclosed implementations, which may have zero downtime.

Figure 7:
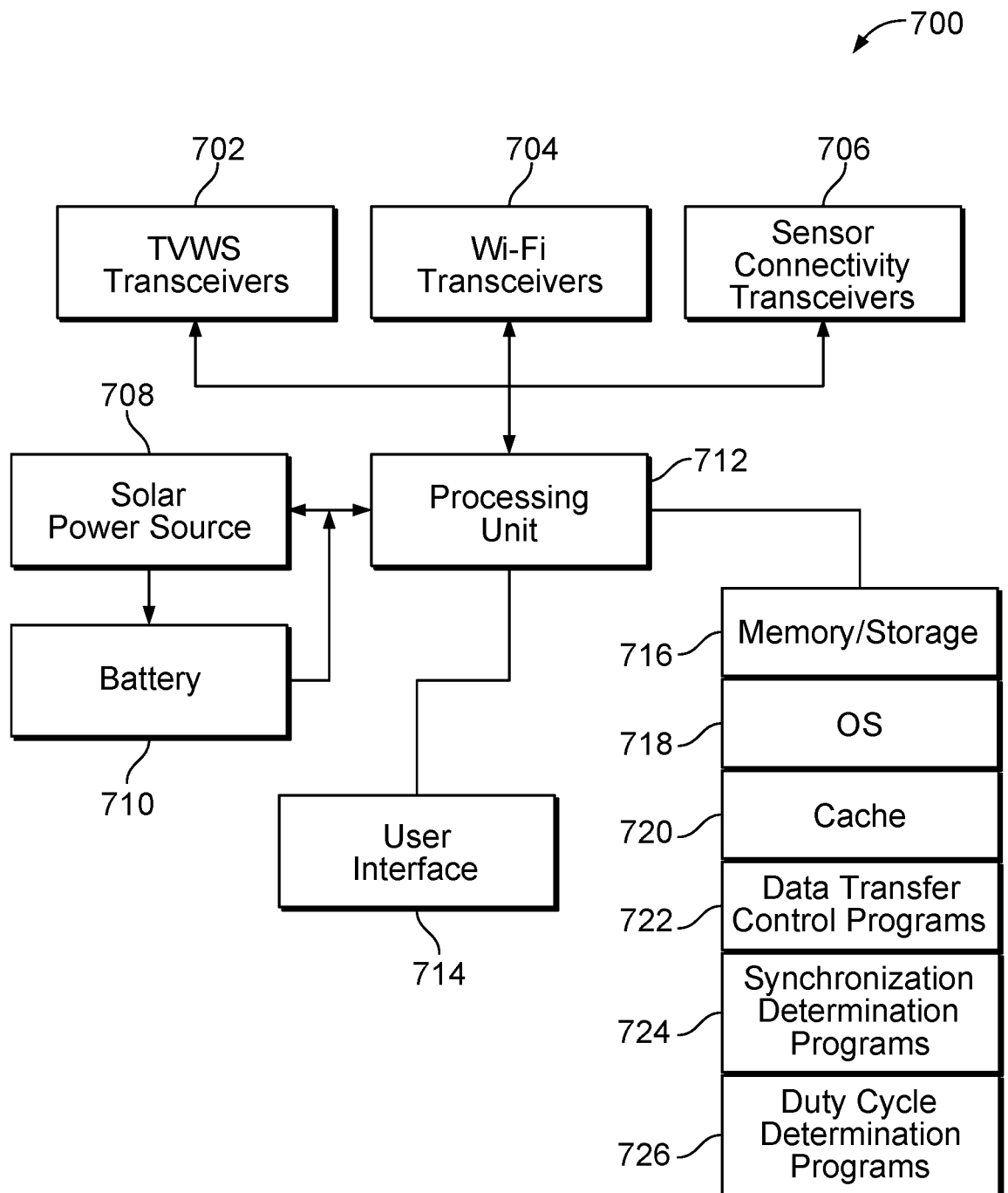

FIG. 7 is a simplified block diagram of an example base station 700. The functions of base station 700 may be implemented in a base station such as base station 103a of FIGS. 1A and 1B. base station 700 may include a processing unit 712, memory/storage 716, TVWS transceivers 702, Wi-Fi on demand transceivers 704, and sensor connectivity transceivers 706. TVWS transceivers 702, Wi-Fi on demand transceivers 704, and sensor connectivity transceivers 706 may be implemented to perform wireless functions described for TVWS module 115, Wi-Fi on demand module 121, and sensor connectivity module 117, respectively of FIG. 1B. User interface 714 provides an interface that allows a base station user to exchange control/configuration information with the base station 700. User interface 714 may be implemented as part of base station 700 or may be implemented through use of devices, such as a mobile device communicating through TVWS transceivers 702. Base station 700 also may include a power source that includes solar power source 708 and back-up battery 710.

Memory/storage 716 may be implemented as any type of computer readable storage media, including non-volatile and volatile memory. Memory/storage 716 is shown as including operating system (OS) 718, cache 720, data transfer control programs 622, synchronization determination programs 724, and duty cycle determination programs 726. Processing unit 712 may comprise one or more processors, or other control circuitry, or any combination of processors and control circuitry that implement the functions of a base station controller to provide overall control of base station 700 according to the disclosed embodiments.

Data transfer control programs 722 may cause processing unit 712 to cause base station 700 to perform functions described in operations 316 and 414 of FIG. 3 and FIG. 4, respectively. Synchronization determination programs 724 may cause processing unit 712 to control base station 700 to provide the synchronization time determination operations described in relation to FIGS. 3 and 4. Duty cycle determination programs 726 may cause processing unit 712 to control base station 700 to perform duty cycle determination operations described in relation to FIGS. 3 and 4.

The example embodiments disclosed herein may be described in the general context of processor-executable code or instructions stored on memory that may comprise one or more computer readable storage media (e.g., tangible non-transitory computer-readable storage media such as memory 716). As should be readily understood, the terms "computer-readable storage media" or "non-transitory computer-readable media" include the media for storing of data, code and program instructions, such as memory 716, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and /or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is meant to include all such implementations.

The disclosed embodiments include an apparatus comprising a first module for communicating with a network, a second module for communicating with at least one data collecting device, one or more processors in communication with the first and second modules; and memory in communication with the one or more processors, the memory including a cache and further comprising code that, when executed, causes the one or more processors to control the apparatus to determine a power budget for power provided by a power source of the apparatus over a time period, and control, over the time period, the first module to collect data from the at least one data collecting device for storage in the cache, and control, over the time period, the second module to synchronize the cache with the network based at least on the power budget. The code further may further cause the one or more processors to control the apparatus to control the first module and the second module by controlling the apparatus to determine, based at least on the power budget, a set of synchronizations to be performed using the first module and a duty cycle for the second module, wherein each of the set of synchronizations is determined from one or more synchronizations for synchronizing between the cache and the network, control the first module to communicate with the network to perform the set of synchronizations during the time period, and, control the second module to communicate with the at least one data collecting device to collect data for the cache according to the duty cycle during the time period. The code may further cause the one or more processors to control the apparatus to determine one or more weights, each of the one or more weights associated with one of the one or more synchronizations, and determine the set of synchronizations and the duty cycle based at least on the power budget and the one or more weights. The one or more synchronizations may each be associated with a synchronization time and the code further may cause the one or more processors to control the apparatus to determine one or more weights, each of the one or more weights associated with a synchronization time of the one or more synchronizations, and determine the set of synchronizations and duty cycle based at least on the power budget and the one or more weights. The code may further cause the one or more processors to control the apparatus to determine the set of synchronizations and the duty cycle by controlling the apparatus to initialize the set of synchronizations to null, place a highest priority synchronization of the one or more synchronizations into the set of synchronizations, remove a power consumption of the highest priority synchronization from the power budget, determine a duty cycle corresponding to the set of synchronizations, determine if a next highest priority synchronization will have data to synchronize with the network based on the duty cycle, and, if the next highest priority synchronization will have data to synchronize, place the next highest priority synchronization in the set of synchronizations, and, repeat the operation of remove a power consumption, determine a duty cycle, and determine if a next highest priority synchronization with the next highest priority synchronization in place of the highest priority synchronization. The code may further cause the one or more processors to control the apparatus to determine the set of synchronizations and the duty cycle by controlling the apparatus to, if the next highest priority synchronization will not have data to synchronize, control the first module to communicate with the network to perform the set of synchronizations during the time period, and, control the second module to communicate with the at least one data collecting device to collect data for the cache according to the duty cycle during the time period.

The power source may comprise a solar power generator and the code may further cause the one or more processors to control the apparatus to determine the power budget for power provided by the solar power generator by including an estimate of power produced by the solar power generator for the time period in the power budget. The apparatus may provide Wi-Fi access to a mobile device and the code may further cause the one or more processors to control the apparatus to determine the power budget by including an estimate of Wi-Fi access power use at the apparatus for the time period in the power budget. The second module may further provide the Wi-Fi access and the estimate of Wi-Fi access power use at the apparatus for the time period may include an estimate of power use at the first module and second module to connect the mobile device to the network. The time period may comprise a current time period, the power source may comprise a battery and a solar power source, and the code may further cause the one or more processors to control the apparatus to determine the power budget by controlling the processor to include a power surplus/deficit from a previous time period in the power budget for the current time period. The power source may comprise a battery and the code may further cause the one or more processors to control the apparatus to determine the power budget by controlling the processor to include power loss to battery leakage and power consumption of the one or more processors over the time period in the power budget. The power source may comprise a solar or wind power source and the code may further cause the one or more processors to control the apparatus to determine the power budget by controlling the processor to include weather effects on the solar power source over the time period for the power budget.

The disclosed embodiments also include a system comprising a base station including a sensor module for communicating with one or more data collecting devices, a synchronization module for communicating with a network, one or more processors in communication with the synchronization module and the sensor module, a power source including a solar power generator providing power to the sensor module, synchronization module, and the one or more processors, and, memory in communication with the one or more processors, the memory including a cache and further comprising code that, when executed, causes the one or more processors to control the apparatus to determine a power budget for the base station from the power source over a time period, and, control the sensor module, over the time period and based at least on the power budget, to collect data from one or more data collecting device for storage in the cache and control the synchronization module to transfer the data from the cache to the network. The system may further comprise one or more sensor devices each including a communications module for communicating with the sensor module of the base station, wherein the one or more sensor devices provide the function of the one or more data collecting devices. the system may further comprise a gateway including a communications module for communicating with the synchronization module of the base station, wherein the gateway provides a connection between the base station and the network for synchronizing the data to the network. The code may further cause the one or more processors to control the base station to control the sensor module and the synchronization module by controlling the base station to determine, based at least on the power budget, a set of synchronizations to be performed and a duty cycle for the second module, wherein each of the set of synchronizations is included in one or more synchronizations to be performed to transfer the data from the cache to the network using the first module, control the synchronization module to communicate with the network to perform the set of synchronizations during the time period, and, control the sensor module to communicate with the at least one data collecting device to collect data for the cache according to the duty cycle during the time period. The code may further cause the one or more processors to control the base station to determine the power budget based on forecasted weather effects on the solar power generator during the time period.

The disclosed implementations also include a base station comprising a first module for communicating with a network, a second module for communicating with a mobile device and with one or more sensor devices, one or more processors in communication with the first and second modules, a power source providing power to the first module, second module, and the one or more processors, and, memory in communication with the one or more processors, the memory including a cache and further comprising code that, when executed, causes the one or more processors to control the apparatus to collect data from the one or more sensor devices using the second module and transfer the data to the network using the first module according to a duty cycle having an on-time, monitor for an indication of possible need for Wi-Fi access, determine that there is no indication of need for Wi-Fi access, and, in response to the determination that there is no indication of Wi-Fi access need, turn off the first module when the first module is not in the on-time of the duty cycle. The base station may monitor for an indication of possible need for Wi-Fi access by monitoring pings from the mobile device using the second module and determine that there is no indication of need for Wi-Fi access by determining that the mobile device has been in power saving mode for a predetermined period of time. The base station may comprise a power source and the code, when executed, may further cause the one or more processors to control the apparatus to determine a power budget for the base station from the power source over a time period, determine a duty cycle having an on-time based at least on the power budget, and, collect data from the one or more sensors using the second module and transfer the data to the network during the on-time of the duty cycle using the first module.

Also, although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method in an apparatus, the method comprising:
   determining a power budget for a time period to provide power from a power source in the apparatus to a first and a second module in the apparatus;
   controlling, based at least on the power budget, the second module to collect data from at least one data collecting device during the time period;
   storing the collected data in a memory of the apparatus; and
   controlling, based at least on the power budget, the first module to synchronize the collected data to the network.

2. The method of claim 1, wherein the at least one data collecting device is one or more of a heat sensor, an infrared sensor, a moisture sensor, a motion sensor, one or more stationary cameras, and a chemical sensor.

3. The method of claim 1, wherein the at least one data collecting device is a sensor configured to provide data about an environment.

4. The method of claim 1, wherein the at least one data collecting device includes a sensor implemented in a moving vehicle.

5. The method of claim 4, wherein the moving vehicle is remotely controlled.

6. The method of claim 4, wherein the moving vehicle is an unmanned aerial vehicle (UAV).

7. The method of claim 1, wherein the at least one data collecting device comprises a plurality of sensors deployed throughout areas on a farm.

8. The method of claim 7, wherein areas on the farm include crop fields and livestock grazing areas.

9. A method in a base station comprising:
providing power to a first module and a second module in the base station;
collecting data from one or more sensors in communication with the base station using the second module according to at least one duty cycle having an on-time;
transferring the collected data to a network using the first module according to the duty cycle;
monitoring for an indication of a need for Wi-Fi access;
determining whether or not there is a need for Wi-Fi access; and
in response to determining that there is no need for Wi-Fi access, removing power from the first module during when the first module is not in the on-time of the duty cycle while maintaining power to the second module.

10. The method of claim 9, wherein monitoring for an indication of a need for Wi-Fi access includes pinging a mobile device, determining whether or not there is a need for Wi-Fi access is based on a ping response time of the mobile device.

11. The method of claim 10, further comprising using the ping response time to determine whether the mobile device has been in power saving mode for a predetermined period of time.

12. The method of claim 9, wherein determining whether or not there is a need for Wi-Fi access is based on proximity of a user of a mobile device detected through motion sensing.

13. The method of claim 9, further comprising:
determining a power budget for the base station from the power source over a time period; and
determining the duty cycle based at least on the power budget.

14. The method of claim 13, further comprising:
determining, based at least on the power budget, a set of synchronization operations to be performed by the first module; and
controlling the first module to communicate with the network to perform the set of synchronizations during the time period.

15. A non-transitory computer-readable storage medium having stored thereon computer executable code, which when executed by one or more processors in a base station, cause the one or more processors to:
determine a power budget over a time period for the base station from a power source in a base station to provide power to a sensor module and a synchronization module in the base station;
control the sensor module, over the time period and based at least on the power budget, to collect data from one or more data collecting devices;
store the collected data in a memory of the base station; and
control the synchronization module, over the time period and based at least on the power budget, to transfer the collected data stored in the memory to the network.

16. The non-transitory computer-readable storage medium of claim 15, wherein the power budget is based on forecasted weather effects on the power source during the time period.

17. The non-transitory computer-readable storage medium of claim 15, wherein the at least one data collecting device is one or more of a heat sensor, an infrared sensor, a moisture sensor, a motion sensor, one or more stationary cameras, and a chemical sensor.

18. The non-transitory computer-readable storage medium of claim 15, wherein the at least one data collecting device includes a sensor implemented in a moving vehicle.

19. The non-transitory computer-readable storage medium of claim 15, wherein the at least one data collecting device comprises a plurality of sensors deployed throughout areas on a farm.

20. The non-transitory computer-readable storage medium of claim 19, wherein areas on the farm include crop fields and livestock grazing areas.

* * * * *